US008922828B2

(12) United States Patent  
Furuichi et al.

(10) Patent No.: US 8,922,828 B2  
(45) Date of Patent: Dec. 30, 2014

(54) DETERMINING SCAN PRIORITY OF DOCUMENTS

(75) Inventors: Sanehiro Furuichi, Kanagawa (JP); Kiriyama Hayato, Kanagawa (JP); Hideo Ichinomiya, Kanagawa (JP); Masami Tada, Kanagawa (JP); Aratsu Taku, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 313 days.

(21) Appl. No.: 13/226,415

(22) Filed: Sep. 6, 2011

(65) Prior Publication Data

US 2012/0069406 A1    Mar. 22, 2012

(30) Foreign Application Priority Data

Sep. 22, 2010    (JP) .................................. 2010-212404

(51) Int. Cl.
*H04N 1/40*    (2006.01)
*G06Q 10/10*    (2012.01)

(52) U.S. Cl.
CPC ........................................ *G06Q 10/10* (2013.01)
USPC ............................................ 358/1.9; 358/468

(58) Field of Classification Search
USPC ........... 358/1.9, 2.1, 468, 402–403, 400, 500, 358/1.15–1.16
See application file for complete search history.

(56) References Cited

U.S. PATENT DOCUMENTS

| | | | |
|---|---|---|---|
| 7,568,148 B1* | 7/2009 | Bharat et al. ................. | 715/200 |
| 7,580,945 B2* | 8/2009 | Liu ................................. | 1/1 |
| 2007/0179937 A1* | 8/2007 | Kawamura et al. ............. | 707/3 |
| 2010/0185568 A1* | 7/2010 | Bates et al. .................... | 706/12 |

FOREIGN PATENT DOCUMENTS

| | | |
|---|---|---|
| JP | 11249979 | 9/1999 |
| JP | 2003-224728 | 8/2003 |
| JP | 2006146878 | 6/2006 |
| JP | 2006209649 | 8/2006 |
| JP | 2006526220 | 11/2006 |
| JP | 2007516435 | 6/2007 |
| JP | 2007-199910 | 8/2007 |
| JP | 2007-334588 | 12/2007 |
| JP | 2008107977 | 5/2008 |
| JP | 2008-191812 | 8/2008 |
| JP | 2008-191813 | 8/2008 |
| JP | 2009-026294 | 2/2009 |
| JP | 2009507271 | 2/2009 |
| JP | 2009514093 | 4/2009 |
| JP | 2009-110225 | 5/2009 |
| JP | 2009532792 | 9/2009 |

* cited by examiner

*Primary Examiner* — Thomas D Lee
*Assistant Examiner* — Stephen M Brinich
(74) *Attorney, Agent, or Firm* — Zilka-Kotab, PC

(57) ABSTRACT

When a group of documents are received, the scan priority of the documents may be determined, according to one embodiment, by acquiring contexts about each of the documents and calculating a scan priority of each of the documents according to a combination of the contexts of the document. Then, each of the documents may be stored to a queue corresponding to the scan priority of the document, such that documents stored in a higher priority queue are processed before documents stored to a lower priority queue. Also, a confidentiality label may be assigned to each of the documents, starting with the documents in the highest priority queue first, based on content acquired from each of the individual documents.

20 Claims, 7 Drawing Sheets

US 8,922,828 B2

DETERMINING SCAN PRIORITY OF DOCUMENTS

RELATED APPLICATIONS

The present application claims priority from Japanese Patent Application No. 2010-212404 filed Sep. 22, 2010, which is herein incorporated by reference.

BACKGROUND

The present invention relates to document processing; and more specifically, this invention relates to determining scan priority of documents.

Typically, the confidentiality of information in a document or file on a computer is determined by an entity, and then a confidentiality label is assigned to the document or file which allows for restricting access to the information to only parties which have authority to access the document or file. However, for example, when an administrator, or the like, specifies a confidentiality label to assign to the document or file, this determination of the confidentiality label is prone to vary from document to document (or file to file) based on the subjective point of view of the administrator, or the like. Moreover, it is difficult to update a confidentiality label once it is set with real-time or appropriate timing. Thus, it would be desirable to automatically determine the confidentiality of a document or file, set a confidentiality label according to the determined confidentiality, and update the confidentiality in real-time.

When automatic calculations are used to determine the confidentiality of a document or file, many different types of calculations may be used. For example, one technique uses a calculation of importance in a manner that depends on statistics regarding each file. Another calculation takes into consideration a number of times the file has been opened. Moreover, estimation of a security attribute value from a similar document may also be used in some calculations.

BRIEF SUMMARY

According to one embodiment, a method includes acquiring contexts about each of a plurality of documents and calculating a priority for each of the documents according to a combination of the acquired contexts thereof.

According to another general embodiment, a system includes an acquisition module adapted for acquiring contexts about each of a plurality of documents, a priority calculation policy comprising rules for calculating priority according to a combination of the acquired contexts, and a calculation module for calculating a priority for each of the documents according to the priority calculation policy.

According to yet another general embodiment, a computer program product for determining priority of a document includes a computer readable storage medium having computer readable program code embodied therewith, the computer readable program code including computer readable program code configured to acquire contexts about each of a plurality of documents, computer readable program code configured to define one or more rules for calculating priority according to a combination of the acquired contexts, and computer readable program code configured to calculate a priority for each of the documents according to the one or more rules.

Other aspects and embodiments of the present invention will become apparent from the following detailed description, which, when taken in conjunction with the drawings, illustrate by way of example the principles of the invention.

DETAILED DESCRIPTION

Figure 1:
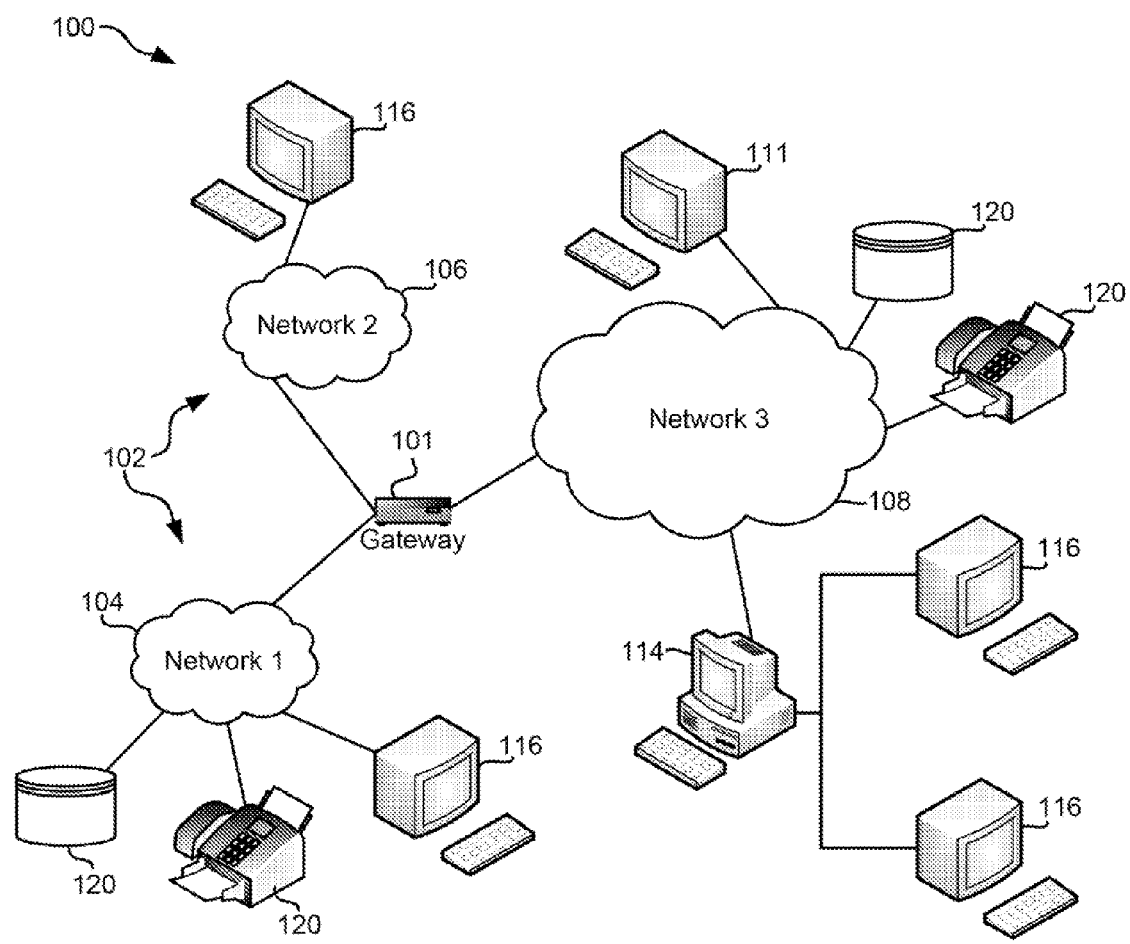
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining scan priority of documents by calculating priority of the documents according to contexts thereof.

According to one general embodiment, a method includes acquiring one or more contexts about each of a plurality of documents and calculating a plurality of priorities according to a combination of one or more acquired contexts, each priority corresponding to one of the plurality of documents.

According to another general embodiment, a system includes an acquisition module adapted for acquiring one or more contexts about each of a plurality of documents, a priority calculation policy comprising rules for calculating priority according to a combination of one or more contexts, and a calculation module for calculating a plurality of priorities according to the priority calculation policy, each of the plurality of priorities corresponding to one of the plurality of documents.

According to yet another general embodiment, a computer program product for determining priority of a document includes a computer readable storage medium having computer readable program code embodied therewith, the computer readable program code including computer readable program code configured to acquire one or more contexts about each of a plurality of documents, computer readable program code configured to define one or more rules for calculating priority according to a combination of one or more contexts, and computer readable program code configured to calculate a plurality of priorities according to the one or more rules, each of the plurality of priorities corresponding to one of the plurality of documents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, allow for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be, implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
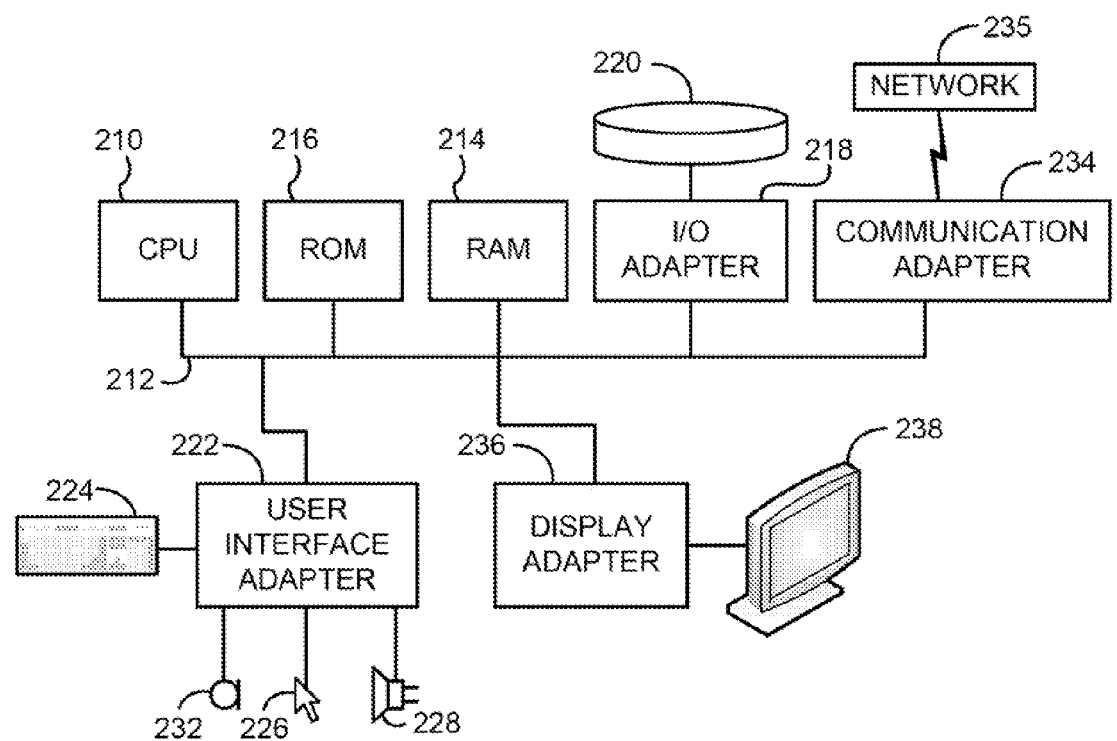
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, this logic may be implemented as a method or in hardware on any device and/or system or as a computer program product, according to various embodiments.

When a document or file is accessed, it is preferable that a confidentiality label be set in advance of this access, and that access control be performed rapidly after the request to access the document or file is received. However, when many documents or files are set to be processed, it takes a long time to perform the processing to properly ascertain the confidentiality label for each document or file. As a result, in some cases, access control based on an appropriate confidentiality label being assigned to each document or file may not function properly, since a confidentiality label may not have been assigned to each document or file prior to receiving the request to access the file.

Thus, when confidentiality labels are set in advance, a determination as to the confidentiality label may be made according to a priority of the document or file requiring review of the assigned confidentiality label. The priorities are affected by dynamic information regarding documents or files, such as momentary changing of operational states. However, conventional methods for determining importance and/or a security attribute are based on static information of documents or files. Therefore, the priorities cannot be set appropriately using conventional methods.

According to one embodiment, a method, a computer program product, and a system are capable of determining priorities for efficiently classifying a plurality of documents and updating the priorities over time.

For simplicity, for the remainder of the discussion, documents, data sets, and/or files will be referred to as documents; however, this is not meant to be limiting on the invention in any way, as documents, files, folders, programs, applications, etc., may be used in conjunction with the embodiments described herein according to various embodiments, as would be understood by one of skill in the art upon reading the present descriptions.

In one embodiment, a method for classifying documents classifies each document into one of a plurality of types of degrees of confidentiality based on content of the document and attaches a corresponding confidentiality label to the document. This method is described later in relation to FIG. 4.

Figure 3:
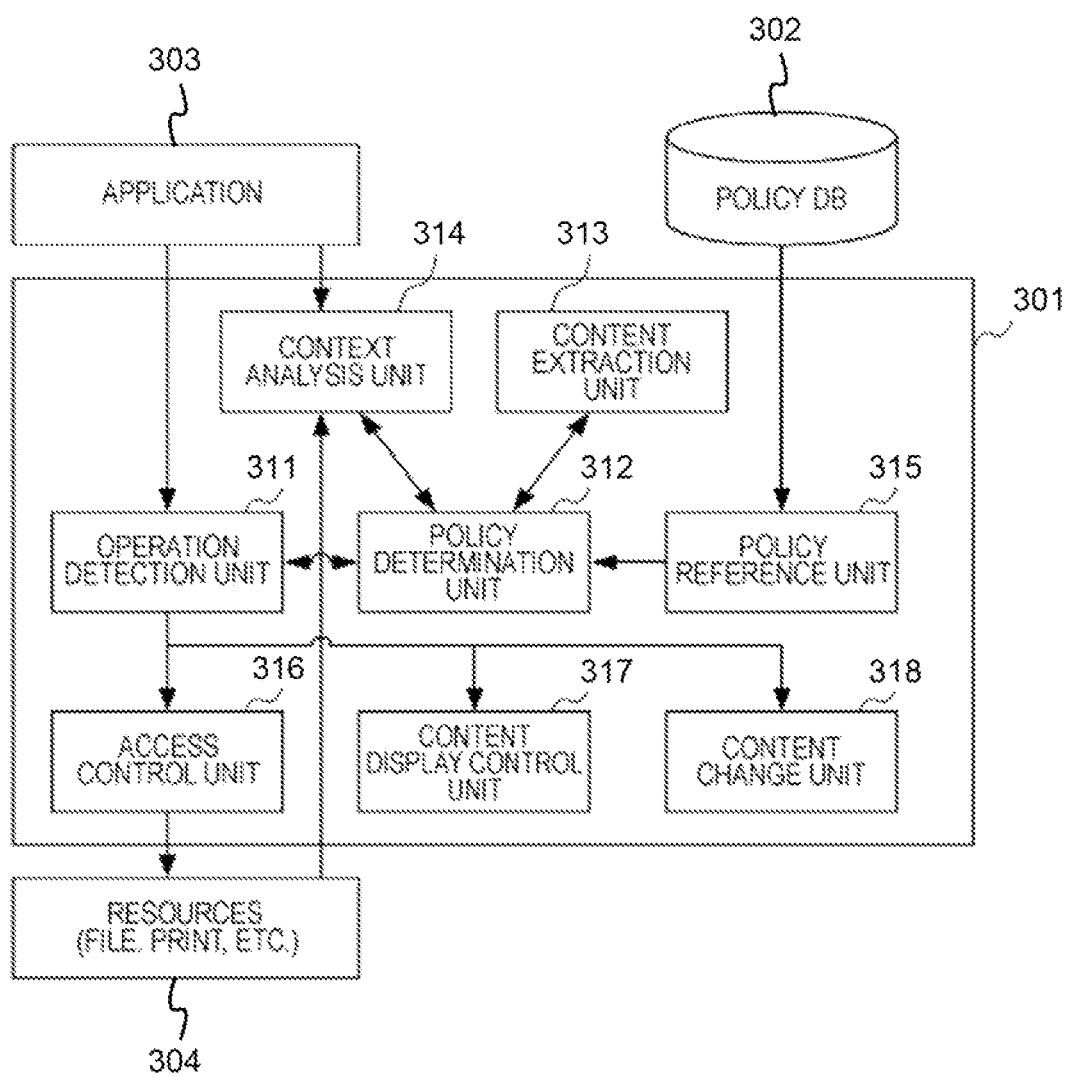
FIG. 3 is a block diagram showing an overall configuration of a document management apparatus, according to one embodiment.

Now referring to FIG. 3, a block diagram is shown of an overall configuration of a document management apparatus 301, according to one embodiment. The individual components of the document management apparatus 301 in the descriptions herein are referred to as modules; however, each component may be separate or included in the document management apparatus 301, and each module may be logic, a unit, a hardware element, etc., as would be understood by one of skill in the art upon reading the present descriptions.

The document management apparatus 301 includes an operation detection module 311, a policy determination module 312, a content extraction module 313, a context analysis module 314 serving as an acquisition module, a policy reference module 315, an access control module 316, a content display control module 317, and a content change module 318.

Moreover, in some embodiments the apparatus 301 may additionally interface with a policy database 302 capable of storing, organizing, and retrieving policy information, one or more applications 303 performing one of a multitude of functions (for example, interacting with documents scheduled for priority determination), and system resources 304, such as system commands, files, print resources, etc., as would be understood by one having ordinary skill in the art upon reading the present descriptions.

The operation detection module 311, in one embodiment, detects an operation that may occur from a user action, in application software, etc., and queries the policy determination module 312 about a confidentiality label of a document subjected to the operation and whether the operation is allowed.

The policy determination module 312, in one embodiment, compares content of a document acquired from the content extraction module 313, context of the document acquired from the context analysis module 314, and other information about the document, with various types of policies acquired from the policy reference module 315. The policy determination module 312 determines the confidentiality label of the document and whether an operation detected by the operation detection module 311 is allowed, according to one approach.

The policy determination module 312 further attaches the confidentiality label to the document based on the content of the document, in one approach. In one embodiment, confidentiality labels are attached to a plurality of documents in advance, by scanning the documents so as to reduce processing load at the time of detection of an operation. When no confidentiality label is attached to a document for which an operation is received, or an attached time is the same as or older than a predetermined time, the policy determination module 312 may determine a confidentiality label at the time of detection of an operation request for the document, in one approach.

The content extraction module 313 extracts the content of an entity, such as a document, a print command, a memory, a screen display, etc., to be used in determination of a confidentiality label and supplies the content to the policy determination module 312, according to one embodiment.

The context analysis module 314 acquires various types of contexts and related information about a document. In one embodiment, a context represents dynamic information regarding a document, such as momentary changing of operational states. Specifically, the context analysis module 314 acquires information about the document, such as an update frequency, an operation time, a state in a workflow, a presence or absence of any active process, a user right, an operation location, etc. The context analysis module 314 further acquires file information about the document, such as a directory name, a file name, an update time, metadata, etc., as information that is related to the context.

The policy reference module 315 extracts at least one of a labeling policy, an enforcement policy, and a priority calculation. The labeling policy may define one or more rules for attaching a confidentiality label based on content, in one approach. The enforcement policy may define the content of control to be performed in a manner that depends on a confidentiality label in one approach. The priority calculation policy calculates the scan priority of the document to which the confidentiality label is attached, referring to an enterprise policy database 302, in one approach. The policy determination module 312 is notified of the various types of policies having been extracted, according to one embodiment.

The access control module 316 allows or rejects an operation detected by the operation detection module 311 based on the result of determination by the policy determination module 312, according to one embodiment.

The content display control module 317 controls the display of content based on the determination by the policy determination module 312. Specifically, the content display control module 317 hides or masks a portion or all of the content, and displays a header, footer, or the like, indicating confidential information is present, according to one example. Of course, other ways of dealing with or displaying confidential or proprietary information may be used, as would be known to one of skill in the art.

The content change module 318 updates content (document data) based on the determination by the policy determination module 312, according to one embodiment. In one example, the content change module 318 may permanently change a part or all of the content or may embed information indicating a confidentiality label in a header, footer, or other suitable storage location as would be understood by one having ordinary skill in the art upon reading the present descriptions.

In this manner, the access control module 316, the content display control module 317, and the content change module 318 may perform control according to the enforcement policy in a manner that depends on a confidentiality label attached to a document according to the labeling policy, in preferred embodiments.

Figure 4:
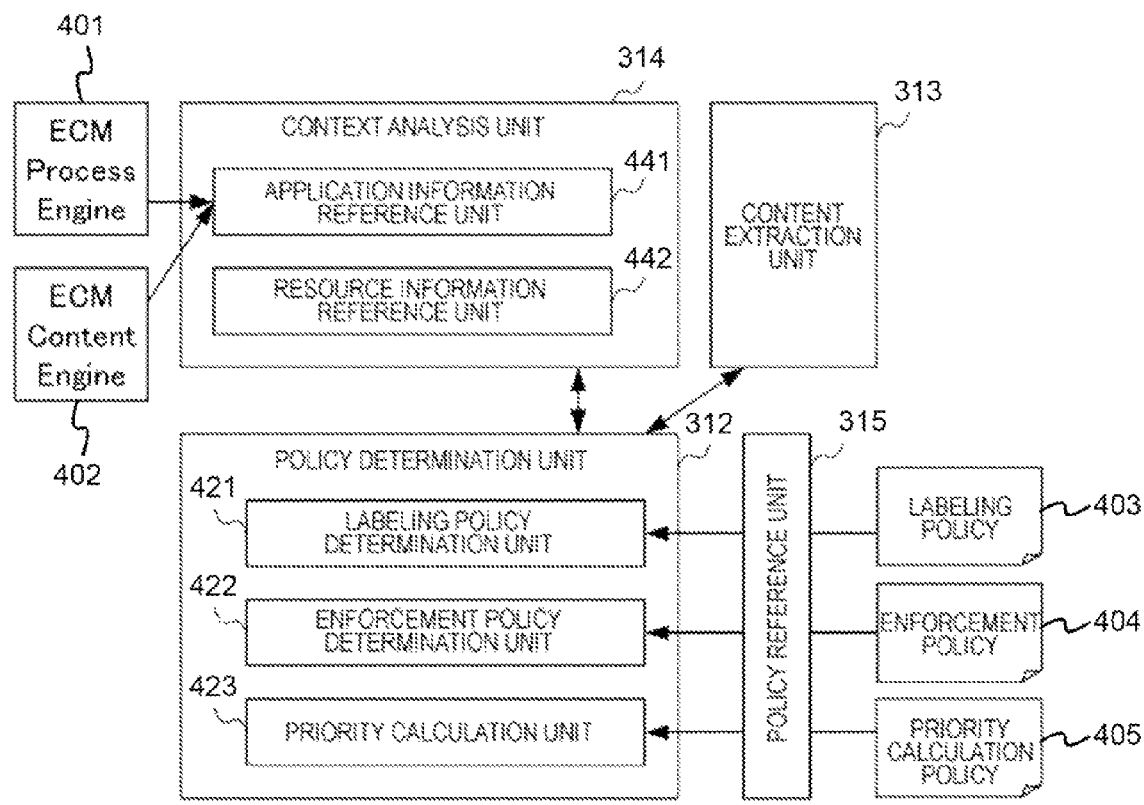
FIG. 4 is a block diagram showing the detailed configuration of a policy determination module and a context analysis module, according to one embodiment.

FIG. 4 is a block diagram showing a detailed configuration of the policy determination module 312 and the context analysis module 314 according to one embodiment. The policy determination module 312 includes a labeling policy determination module 421, an enforcement policy determination module 422, and a priority calculation module 423 for performing calculations, according to one embodiment. The context analysis module 314 includes an application information reference module 441 and a resource information reference module 442, according to one embodiment.

The labeling policy determination module 421 acquires the latest labeling policy from the policy reference module 315 and compares the labeling policy with the content of a document extracted by the content extraction module 313 to determine the confidentiality label of the document. This determination is performed in advance, when requested, or with a predetermined timing, for example, while the document management apparatus 301 is idle or at a predetermined time, in a manner that depends on a priority set by the priority calculation module 423 described herein. Also, confidentiality labels are attached to a plurality of documents to be managed. The labeling policy determination module 421 stores the determined confidentiality labels in association with the documents to which the confidentiality labels correspond.

The enforcement policy determination module 422 acquires the latest enforcement policy from the policy reference module 315 and determines the content of control corresponding to the confidentiality label of a document, in one approach. In this case, according to determination logic defined in the enforcement policy, the enforcement policy determination module 422 acquires, for example, content and file information from the content extraction module 313 or the context analysis module 314, if necessary, to determine the content of control.

The priority calculation module 423 acquires the latest priority calculation policy from the policy reference module 315, sets the scan priority of each document in a process in which the labeling policy determination module 421 determines a confidentiality label, and stores the document in a queue corresponding to the scan priority, according to one embodiment. In one approach, the priority calculation module 423 calculates the scan priority according to the priority calculation policy in a manner that depends on the combination of contexts acquired by the context analysis module 314 regarding the document to be processed. Then, the labeling policy determination module 421 attaches a confidentiality label to a document stored in each of the queues with predetermined timing corresponding to the scan priority.

The application information reference module 441 acquires various types of contexts regarding a document from predetermined application programs, according to one approach. In one embodiment, a context represents dynamic information regarding a document file, such as momentarily changing operational states. Specifically, the application information reference module 441 acquires, for example, a state in a workflow from an application program referring to the information of a process engine and the frequency of updating of a document, a time for which a document file has been opened as an operation time, and the like, from an application program referring to the information of a content engine, out of Enterprise Content Management (ECM) tools.

The ECM Process Engine 401 may provide ECM processing for the application information reference module 441, while the ECM Content Engine 402 may provide content to the application information reference module 441, according to one approach.

The resource information reference module 442 acquires various types of contexts about a document from various types of resource information of, for example, processes and networks, in one approach. Specifically, the resource information reference module 442 acquires information on, for example, the presence or absence of any active process that can access a document, a user role in which an access right is defined, and an operation location, e.g., a location inside or outside a company.

The resource information reference module 442 further acquires, in combination with the contexts, file information referred to in the enforcement policy, in one approach. File information may be, for example, a directory name, a file name, an update time, metadata, etc. Thus, the enforcement policy may prohibit copying of a document file with a specific file name to an external memory when a process is active, in one example. Of course, other actions, operations, and/or decisions may be made according to the descriptions presented herein.

Figure 5:
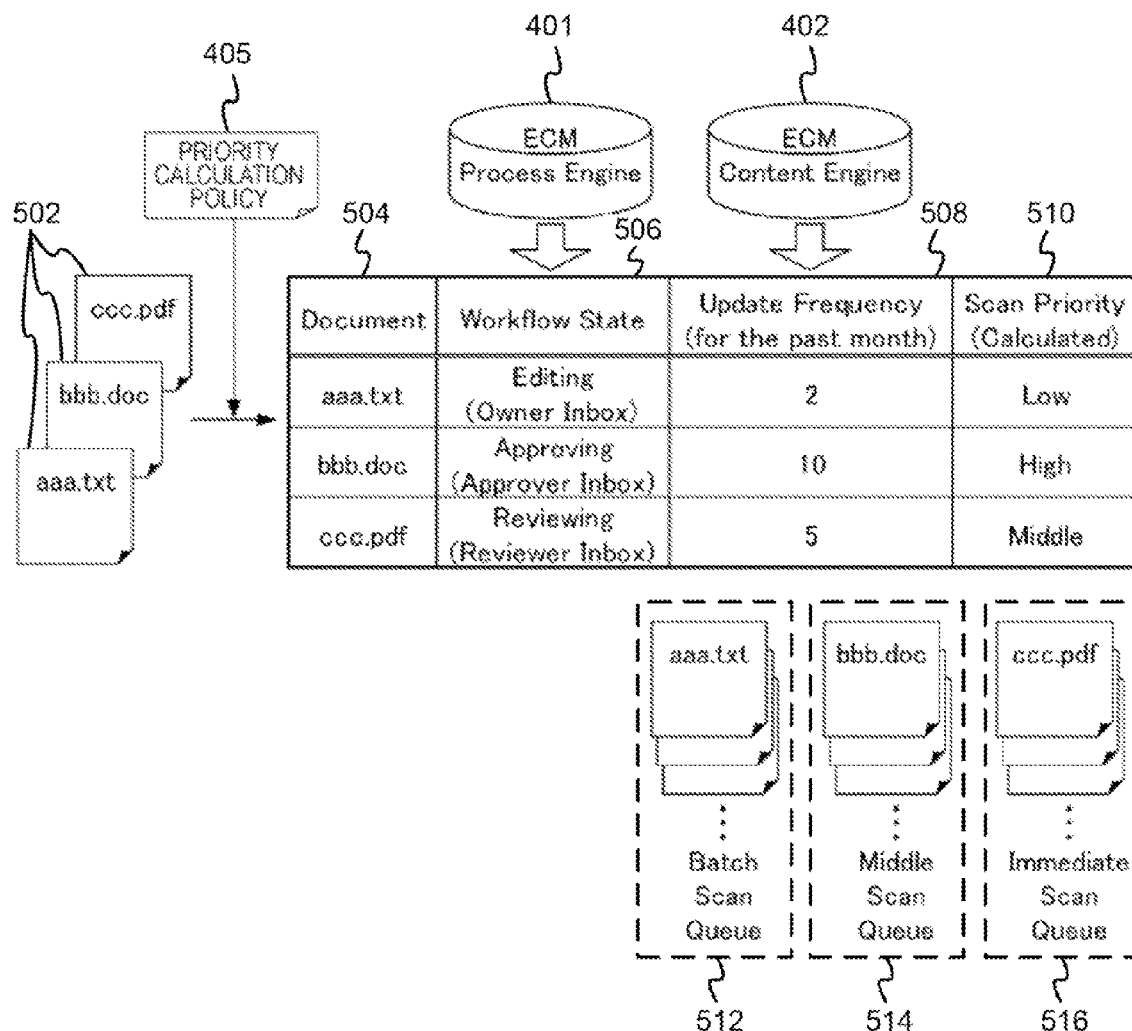
FIG. 5 is an illustration showing exemplary calculation of document priority, according to one embodiment.

FIG. 5 is an illustration showing an exemplary calculation of scan priority, according to one embodiment. In the exemplary calculation, three types (High, Middle, and Low) of scan priorities 510 are calculated based on workflow states 506 acquired from an ECM Process Engine 401, and update frequencies 508 (the numbers of times updating has been performed for a month) acquired from an ECM Content Engine 402.

There are three documents 502 shown (aaa.txt, bbb.doc, and ccc.pdf), and these names are listed under the document header 504. However, the invention is not limited to these document types alone, as any document or file as described previously may be used in conjunction with the descriptions provided herein according to various embodiments. Contexts (workflow states 506 and update frequencies 508 for example) are acquired, and scan priorities 510 based on combinations of the contexts are calculated according to predetermined calculation rules in compliance with the priority calculation policy 405.

The document file bbb.doc, for which high scan priority (High) is set, is stored in a queue (Immediate Scan Queue 516) in which labeling is performed immediately. The document file ccc.pdf, for which middle scan priority (Middle) is set, is stored in a queue (Middle Scan Queue 514) in which labeling is performed not urgently but with predetermined timing (for example, an occasion such as occurrence of idling). Moreover, the document file aaa.txt, for which low scan priority (Low) is set, is stored in a queue (Batch Scan Queue 512) in which labeling is performed by batch processing at a predetermined time.

In this manner, when scan priorities have been calculated according to the priority calculation policy, individual documents are assigned to a plurality of queues the respective execution timings (for example, a time until execution of a process or an execution frequency) of which are different due to different execution occasions for labeling, and labeling is performed by priority for documents requiring reviews of corresponding confidentiality labels, according to one embodiment.

Figure 6:
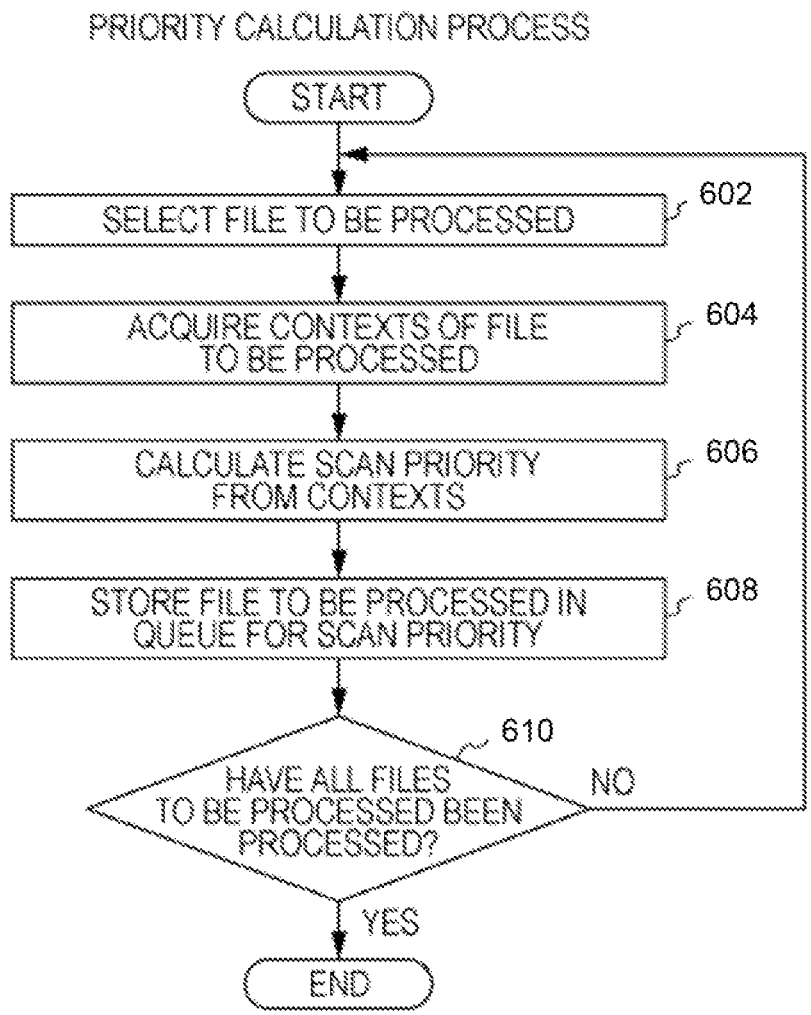
FIG. 6 is a flowchart of a method for calculating scan priority, according to one embodiment.

FIG. 6 is a flowchart showing a method 600 for calculating scan priority, according to one embodiment. The method 600 may be carried out in any desired environment, including those shown in FIGS. 1-5, according to various embodiments. Of course, more or less operations than those described in FIG. 6 may be included in method 600, as would be understood by one of skill in the art.

In operation 602, a document (file) to be processed (e.g., to which a confidentiality label is to be attached) is selected, such as by the priority calculation module.

In operation 604, regarding the document file selected, a combination of contexts is acquired, such as by the priority calculation module, to be referred to in a priority calculation policy, such as by causing the context analysis module to analyze contexts.

In operation 606, the scan priority is calculated for each of the documents, such as by the priority calculation module, according to the priority calculation policy based on the combination of contexts thereof.

In operation 608, in a manner that depends on the scan priority calculated in operation 606, the document file is stored, such as by the priority calculation module, to be processed in one of the queues provided for respective scan priorities.

In operation 610, it is determined whether all document files to which corresponding confidentiality labels are to be attached have been processed and the corresponding scan priorities have been set, such as by the priority calculation module. In this example, the priority calculation module may terminate the process when this determination is YES and may cause the process to return to operation 602 to set the scan priority of another document file when the determination is NO.

Figure 7:
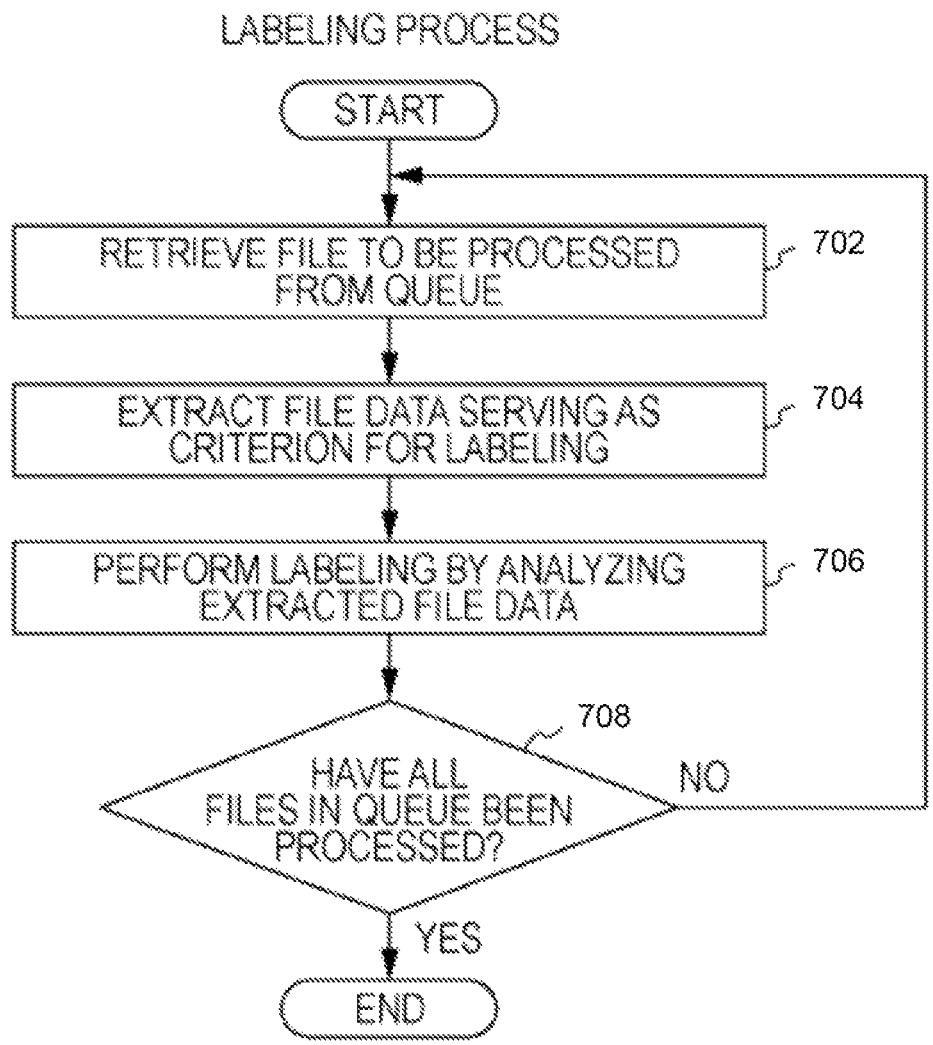
FIG. 7 is a flowchart of a method for attachment of labels of degrees of confidentiality, according to one embodiment.

FIG. 7 is a flowchart showing a method 700 for attaching labels of degrees of confidentiality, according to one embodiment. The method 700 may be carried out in any desired environment, including those shown in FIGS. 1-5, according to various embodiments. Of course, more or less operations than those described in FIG. 7 may be included in method 700, as would be understood by one of skill in the art. This method 700 may be performed for a queue for each scan priority with corresponding predetermined timing.

In operation 702, a document is retrieved to be processed from a predetermined queue, such as by the labeling policy determination module.

In operation 704, regarding the document file retrieved, file data is extracted, such as by the labeling policy determination module, that is content that may serve as a criterion for labeling, according to the labeling policy, which may be acquired through the policy reference module in one example.

In operation 706, the file data extracted in operation 704 is analyzed, such as by the labeling policy determination module, and a confidentiality label is attached to the document according to the labeling policy to be processed, such as by the labeling policy determination module.

In operation 708, it is determined whether all documents in the queue have been processed and corresponding confidentiality labels have been attached to the documents, such as by the labeling policy determination module. The labeling policy determination module may terminate the process when this determination is YES and may cause the process to return to operation 702 to attach a label to another document when the determination is NO.

According to one embodiment, the document management apparatus may set the scan priority of a document to be scanned to review a corresponding confidentiality label based on contexts of the document, as described herein. That is, the document management apparatus may determine scan priorities for efficiently classifying a plurality of documents. Thus, in a process of performing labeling by analyzing contents of many documents, a process which typically requires a long time, the document management apparatus may efficiently process documents in descending order of necessity and/or priority.

Moreover, since a context represents dynamic information regarding a document file, such as momentarily changing operational states, the document management apparatus may adapt to the necessity of scanning varying with the state by dynamically changing scan priority. As a result, in the document management apparatus, since the confidentiality label of a document may be updated in advance at an appropriate time, when access to the document occurs, an access control policy may be applied immediately.

Moreover, in a manner that depends on calculated scan priority, the document management apparatus may store each document file in one of several queues, respective timings of labeling for the queues being different. Thus, documents subjected to labeling at each of the timings are clarified, and processing is efficiently performed.

While scan priority is calculated based on contexts of a document in one embodiment, static information of a document, for example, a directory name, a file name, an update time, metadata, etc., and/or a part of content may be additionally used as criteria for calculation.

Moreover, the document management apparatus may adjust scan priority based on an elapsed time since labeling was performed the last time for a document to be processed. For example, the shorter the elapsed time is, the lower the calculated scan priority of the document is.

While scan priority is set for a labeling process of classifying documents according to corresponding degrees of confidentiality in one embodiment, the document classification process described herein is not limited to this process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   acquiring contexts about each of a plurality of documents from each of the documents using a context extraction module of a document management apparatus;
   calculating a priority for each of the documents according to a combination of the acquired contexts from each document using a priority calculation module of the document management apparatus;
   storing one or more first documents in a first queue according to the priority of the one or more first documents; and
   storing one or more second documents in a second queue according to the priority of the one or more second documents, wherein each of the queues is characterized as having a unique classification timing.

2. The method as recited in claim 1, wherein each of the acquired contexts comprise dynamic information regarding one of the documents and at least one of: an update frequency, an operation time, a state in a workflow, a presence of an active process, an absence of an active process, a user right, and a location, wherein the dynamic information comprises at least momentary changing of an operational state.

3. The method as recited in claim 1, further comprising storing one or more of the documents in one or more queues according to the priority of each document, wherein each of the queues is characterized as having a unique classification timing.

4. The method as recited in claim 3, wherein the priority of at least one of the plurality of documents is adjusted according to an amount of time elapsed since the document was stored in the one or more queues.

5. The method as recited in claim 1, further comprising assigning a degree of confidentiality to each of the documents according to a content thereof.

6. The method as recited in claim 1, further comprising:
   assigning a degree of confidentiality to each of the documents according to a content thereof; and
   adjusting the priority of at least one of the first and second documents according to an amount of time elapsed since the at least one of the first and second documents was stored in one of the queues,
   wherein each of the acquired contexts comprise dynamic information regarding one of the documents and at least one of: an update frequency, an operation time, a state in a workflow, a presence of an active process, an absence of an active process, a user right, and a location, wherein the dynamic information comprises at least momentary changing of an operational state.

7. A system, comprising:
   an acquisition module adapted for acquiring contexts about each of a plurality of documents;
   a priority calculation policy comprising rules for calculating priority according to a combination of the acquired contexts;
   a calculation module for calculating a priority for each of the documents according to the priority calculation policy; and
   a storage module for storing one or more first documents in a first queue according to the priority of the one or more first documents and storing one or more second documents in a second queue according to the priority of the one or more second documents,
   wherein each of the queues is characterized as having a unique classification timing.

8. The system as recited in claim 7, wherein each of the acquired contexts comprise dynamic information regarding one of the documents, the dynamic information comprising at least momentary changing of an operational state, and wherein the acquired contexts comprise at least one of: an update frequency, an operation time, a state in a workflow, a presence of an active process, an absence of an active process, a user right, and a location.

9. The system as recited in claim 7, further comprising a storing module adapted for storing one or more of the documents in one or more queues according to the priority of each document, wherein each of the queues is characterized as having a unique classification timing.

10. The system as recited in claim 9, wherein the priority of at least one of the documents is adjusted according to an amount of time elapsed since the document was stored in the one or more queues.

11. The system as recited in claim 7, further comprising a confidentiality module adapted for assigning a degree of confidentiality to each of the documents according to a content thereof.

12. The system as recited in claim 11, further comprising:
a policy reference module adapted for acquiring a policy; and
a policy determination module adapted for retrieving the plurality of documents from a predetermined queue, attaching the assigned degree of confidentiality to each of the documents, and comparing the content and the combination of the acquired contexts of each document with the acquired policy.

13. The system as recited in claim 7, further comprising:
a storing module adapted for storing one or more of the documents in one or more queues according to the priority of each document; and
a confidentiality module adapted for assigning a degree confidentiality to each of the documents according to a content thereof,
wherein each of the queues is characterized as having a unique classification tinting,
wherein the priority of at least one of the documents is adjusted according to an amount of time elapsed since the document was stored in the one or more queues, and
wherein the acquired contexts comprise at least one of: an update frequency, an operation time, a state in a workflow, a presence of an active process, an absence of an active process, a user right, and a location.

14. A computer program product for determining priority of a document, the computer program product comprising a non-transitory computer readable storage medium having computer readable program code embodied therewith, the computer readable program code comprising:
computer readable program code configured to acquire contexts about each of a plurality of documents from each of the documents, wherein each of the contexts comprise dynamic information regarding one of the documents, the dynamic information comprising at least momentary changing of an operational state;
computer readable program code configured to define one or more rules for calculating priority according to a combination of the acquired contexts;
computer readable program code configured to calculate a priority for each of the documents according to the one or more rules; and
computer readable program code configured to store the documents into at least two queues according to the priority of each document, wherein each of the queues is characterize as having a unique classification timing.

15. The computer program product as recited in claim 14, wherein the acquired contexts comprise at least one of: an update frequency, an operation time, a state in a workflow, a presence of an active process, an absence of an active process, a user right, and a location.

16. The computer program product as recited in claim 14, further comprising:
computer readable program code configured to store one or more first documents in a first queue according to the priority of the one or more first documents; and
computer readable program code configured to store one or more second documents in a second queue according to the priority of the one or more second documents.

17. The computer program product as recited in claim 16, wherein the priority of at least one of the documents is adjusted according to an amount of time elapsed since the document was stored in the at least two queues.

18. The computer program product as recited in claim 14, further comprising computer readable program code configured to assign a degree of confidentiality to each of the documents according to a content thereof.

19. The computer program product as recited in claim 14, further comprising;
computer readable program code configured to retrieve the plurality of documents from a predetermined queue;
computer readable program code configured to extract content from each of the documents to serve as criterion for labeling thereof;
computer readable program code configured to assign a degree of confidentiality to each of the documents according to an extracted content thereof; and
computer readable program code configured to adjust the priority of at least one of the documents according to an amount of time elapsed since the document was stored in one of the queues,
wherein the acquired contexts comprise at least one of: an update frequency, an operation time, a state in a workflow, a presence of an active process, an absence of an active process, a user right, and a location.

20. The computer program product as recited in claim 14, further comprising:
computer readable program code configured to retrieve the plurality of documents from a predetermined queue; and
computer readable program code configured to extract contact from each of the documents to serve as criterion for labeling thereof.

\* \* \* \* \*